Sept. 13, 1949.  C. W. HANSELL  2,481,589
MEASURING OF HIGH-FREQUENCY POWER
Original Filed Oct. 10, 1942
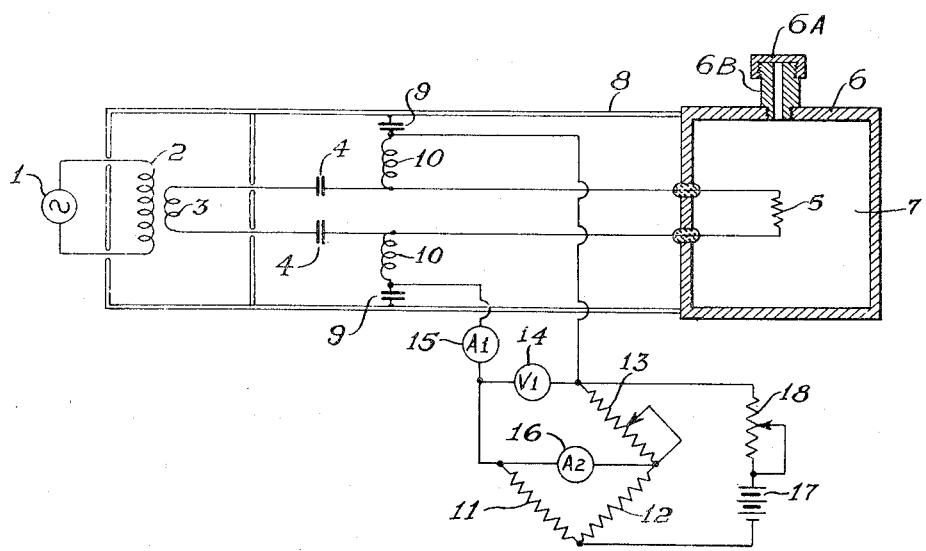
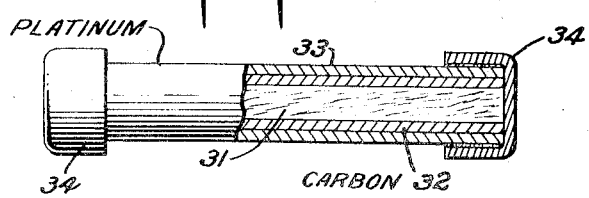
Inventor:
CLARENCE W. HANSELL
By H. S. Grover
Attorney Patented Sept. 13, 1949

2,481,589

UNITED STATES PATENT OFFICE 2,481,589

MEASURING OF HIGH-FREQUENCY POWER

Clarence W. Hansell, Rocky Point, N. Y., assignor to Radio Corporation of America, a corporation of Delaware Original application October 10, 1942, Serial No. 461,542. Divided and this application April 20, 1944, Serial No. 531,911

5 Claims. (Cl. 171—95)

This application is a division of my application Serial No. 461,542, which has matured into U. S. Patent No. 2,366,614, dated January 2, 1945. The patent contains claims directed to the resistance element, whereas this divisional application contains claims directed to the high frequency power measuring circuit.

Coated resistances are old in the prior art. However, such resistances are generally unsuitable for ultra high frequency radio circuits (in the order of 500 megacycles or more) because at these very high frequencies heating develops, and this causes a change in temperature, together with associated circuit losses. Also, because of the high temperature caused by the passage of the ultra high frequencies through the resistance material, oxidation occurs, which destroys the value of the resistance in a relatively short period of operation. Therefore, it is a desirable characteristic of a resistance to have a low temperature coefficient. By my invention I propose to overcome the difficulties mentioned above by coating a resistance support element, preferably an insulator, with two separate processed layers, one layer being of carbon and the other of platinum. I have found that an improved resistance can be obtained by first applying a layer of carbon (which will decrease resistivity with increasing temperature) and then the metallic platinum which increases resistivity with increasing temperature; thus, the two coatings compensate and cooperate to give an improved resistance element.

This invention will best be understood by referring to the accompanying drawing, in which Fig. 1 is a circuit diagram of a radio frequency power measuring system employing the resistance of this invention for measuring high frequency power by the substitution method.

Fig. 2 is a detail of a simple form of the resistance device of this invention.

Referring now in detail to Fig. 1 of the drawing, there is shown a means to measure the high frequency power of an ultra high frequency radio circuit by the lamp load substitution method in which there is a source of power 1, such as an oscillation generator which is connected to a transformer having a primary 2 and a secondary 3 connected by a short section of a transmission line terminated in a resistance 5, which is substituted for the normal load of a radio transmitter and coupled by condenser 4 to give the same transmitter load conditions as the normal load. The resistance 5 is insulatingly located within an enclosed space, suitably that of metallic container 6, filled with an inert, or oxygen hungry, gas 7. The chamber 6 is provided with an outer metallic shield 8 which encloses the circuit between container 6 and secondary 3. A balanced filter arrangement comprising condenser 9 and conductive reactance 10 is connected between the leads from the load of resistance 5 and the shield 8. Leads are connected from each filter section to a resistance bridge including fixed resistances 11 and 12, and a calibrated variable resistance 13, which is connected to a junction point of resistance 12. A voltmeter 14 is connected across the other side of variable resistance 13 and fixed resistance 11. An ammeter 15 is connected in series between the lead connecting the filter and voltmeter 14. Across two diagonals of the bridge arrangement there is provided an indicating device, such as a milliammeter 16 or a galvanometer. The opposite diagonal of the bridge has a source of direct current power voltage 17 to give control of direct current power to the load resistance 5 which is connected in series with a variable resistance 18.

To ascertain the radio frequency power, the following steps are taken: First, the bridge is balanced with the radio frequency from source 1 "On" and the readings of the voltmeter 14 and ammeter 15 observed. It is to be noted that this reading is a mixture of radio frequency from source 1 and direct current power from source 17. In the next step the radio frequency is shut off, leaving the adjustment of the bridge balance the same. Next, the power input of the bridge circuit from source 17 is raised by the adjustment of resistance 18 until the bridge is rebalanced, and then the voltage and current on meters 14 and 15, respectively, are again read. The then obtained direct current power reading with the last mentioned balance of the bridge is subtracted from the first obtained power reading of the voltmeter and ammeter, which will give the true value of the radio frequency obtained from source 1.

Referring now to Fig. 2, the simple form of resistance 5 of this invention is shown in detail and comprises a support member in the form of a strip or loop of quartz fiber 31 to be coated with resistance material of a desired thickness in order to obtain a predetermined value of resistance, and as mentioned above, I propose that the resistance coating be made in two layers, one of carbon and one of platinum. The support member 31 may also be in the form of a metal wire or a tube.

The carbon coating 32 is applied by dipping the quartz filament in a solution of colloidal graphite and water. The mixture of graphite and water may be diluted so that several dippings, with drying steps between the dips, are required to obtain the desired resistance. When properly done the application of the carbon in this manner provides a very thin, smooth, uniform and strongly adherent coating.

Another material which may be used is colloidal graphite in oil. This material may be used to build up carbon coatings if it is suitably diluted with gasoline or other vaporizable solvent, provided the filament is heated between dips in an inert atmosphere to prevent oxidation and to vaporize and carbonize the oil.

In practice it is recommended that the carbon coating 32 be applied first, followed by a platinum coating 33, which results in an intimate mixture of carbon and platinum, in which the plantinum will act as a binder and to some extent form a protective coat for the carbon.

The platinum coating may be applied by dipping the carbon coated quartz fiber 31 in a solution of platinic chloride in natural oil of lavender, alcohol and a little burgundy pitch of suitably adjusted strength, followed by heating in an inert atmosphere to vaporize the solvents and to reduce the platinic chloride to platinum metal. Suitable similar platinizing solutions are available commercially. They are usually used for decoration of tableware; and, in industry, are used as a coating on porcelain to permit soldering together of poreclain and metal parts in airtight electrical bushings. Ordinarily, the commercial solutions would result in the application of a layer of platinum too thick for the present purpose so it is necessary that the commercial solutions be diluted as required with a mixture of oil of lavender, alcohol and pitch to get the high resistance coating necessary.

The ends of the support member 31 are provided with metal end caps 34 arranged to be securely anchored to filamentary quartz in such a manner as to make contact with both the carbon layer 32 and the platinum layer 33. Other modifications of the resistance 5 will be found in my Patent No. 2,366,614.

In the operation of this device, the high temperatures encountered might cause the metallic surfaces to oxidize. Therefore, it is desirable to place the resistance element 5 within the casing 6, fill the casing with an inert gas such as hydrogen by means of removing the filler cap 6A on casing valve 6B, and insert the inert gas or oxygen hungry atmosphere. It might be desirable to apply both high frequency and a direct current or low frequency power to the resistance 5 in order to hold a constant temperature for reading. Then the difference in direct current, or low frequency power, required to bring the filament to an arbitrary temperature (with the high frequency on or off) is a measure of the high frequency power. As an indication of temperature, the use of a metal coated quartz fiber would permit measuring the temperature by measuring the resistance. Since the metal has a large coefficient of resistance, the value of resistance is a good measure of temperature. Furthermore, by adjusting the direct current heating, the high frequency value of the resistance may be adjusted; then, by varying the temperature, a desired value of load resistance is obtained. By varying the potential applied to the resistance bridge circuit from the direct current source, the filament temperature may be adjusted over a considerable range to provide for matching the characteristic impedance of the transmission line, or to otherwise control the loading conditions.

If the transmitter power is turned "On" and "Off" (and for both conditions the direct current power to the filament is adjusted by resistance 18 to give the same filament resistance), then the difference in direct current power required for the two conditions is equal to the radio frequency power into the filament when the transmitter is turned "On."

What I claim is:

1. Means to measure high frequency power comprising a bridge circuit containing resistance arms, a source of power connected to dissipate power in a first one of said resistance arms, a variable resistance connected in series between said source of power and said first resistance arm, a metallic container, a resistive element having layers of carbon and platinum, said resistive element being located within said metallic container and connected to a second one of said resistance arms, a short section of a transmission line connected to said resistive element, said transmission line being coupled to the output circuit of a radio transmitter, and a metallic shield for enclosing said short section of said transmission line.

2. Means to measure high frequency power comprising a bridge circuit containing resistance arms, a source of power connected to dissipate power in a first one of said resistance arms, a variable resistance connected in series between said source of power and said first resistance arm, a transformer connected to a high frequency circuit containing high frequency waves, a metallic container, a resistive element having layers of carbon and platinum, said resistive element being located within said metallic container and connected to a second one of said resistance arms, a short section of a transmission line connected to said resistive element, said transmission line being coupled to said transformer, and a metallic shield for enclosing said short section of said transmission line.

3. Means to measure high frequency power comprising a bridge circuit containing resistance arms, a source of power connected to dissipate power in a first one of said resistance arms, a variable resistance connected in series between said source of power and said first resistance arm, a transformer connected to a high frequency circuit containing high frequency waves, a metallic container, a resistive element having layers of carbon and platinum, said resistive element being located within said metallic container and connected to a second one of said resistance arms, a short section of a transmission line connected to said resistive element, coupling condensers connected between each side of said transmission line and said metallic container, said transmission line being coupled to said transformer, and a metallic shield for enclosing said short section of said transmission line.

4. Means to measure high frequency power comprising a bridge circuit containing resistance arms, a source of power connected to dissipate power in a first one of said resistance arms, a variable resistance connected in series between said source of power and said first resistance arm, a transformer connected to a high frequency circuit containing high frequency waves, a radio frequency shield in the form of a metallic container, a resistive element having layers of carbon and platinum, said resistive element being located within said metallic container and connected to a second one of said resistance arms, a short section of a transmission line connected to said resistive element, a reactance element and a capacitive element series connected between one side of each transmission line and said metallic container, said reactance and capacitive elements forming a balanced filter, said transmission line being coupled to said transformer, and a metallic shield for enclosing said short section of said transmission line.

5. Electrical measuring apparatus comprising a source of oscillating power, a shield in the form of a metallic chamber, a transformer having a primary and a secondary winding located within said chamber, leads passing through a wall in said metallic chamber and connecting said primary winding to said source of oscillating power, a resistance of the type having two conductive layers, one layer being of material which decreases in resistivity with increasing temperature, the other layer being of material which increases resistivity with increasing temperature, a short section of a transmission line terminated at one end by said resistance and at the other end by said secondary winding, a condenser in each lead of said transmission line, said resistance being located in a metallic container having an inert gas located therein, two similar filters each including a condenser and a conductive reactance, said filters being respectively connected between different sides of said transmission line and the walls of said shielded chamber, a bridge circuit having different arms connected to said filters, and instrumentalities to indicate the change in resistance in said two-conductive-layer resistance and thereby the power in said source of oscillating power.

CLARENCE W. HANSELL.

REFERENCES CITED

The following references are of record in the file of this patent:

UNITED STATES PATENTS

| Number | Name | Date |
| --- | --- | --- |
| 1,287,970 | Greinacher et al. | Dec. 17, 1918 |
| 1,451,283 | Weatherwax | Apr. 10, 1923 |
| 1,590,420 | Chubb | June 29, 1926 |
| 1,901,741 | Fetsch | Mar. 14, 1933 |
| 2,284,379 | Dow | May 26, 1942 |
| 2,314,764 | Brown | Mar. 23, 1943 |
| 2,399,481 | George | Apr. 30, 1946 |